(12) United States Patent
Pahlevaninezhad et al.

(10) Patent No.: US 11,212,900 B2
(45) Date of Patent: Dec. 28, 2021

(54) LED APPARATUS HAVING ONE OR MORE COMMUNICATION UNITS AND A METHOD OF EMPLOYING SAME

(71) Applicant: 10644137 CANADA INC., Calgary (CA)

(72) Inventors: Majid Pahlevaninezhad, Calgary (CA); Sam Scherwitz, Calgary (CA)

(73) Assignee: 10644137 CANADA INC., Calgary (CA)

( * ) Notice: Subject to any disclaimer, the term of this patent is extended or adjusted under 35 U.S.C. 154(b) by 0 days.

(21) Appl. No.: 16/496,323

(22) PCT Filed: Mar. 22, 2018

(86) PCT No.: PCT/CA2018/050349
§ 371 (c)(1),
(2) Date: Sep. 20, 2019

(87) PCT Pub. No.: WO2018/170601
PCT Pub. Date: Sep. 27, 2018

(65) Prior Publication Data
US 2020/0111409 A1    Apr. 9, 2020

Related U.S. Application Data (60) Provisional application No. 62/475,062, filed on Mar. 22, 2017.

(51) Int. Cl.
*H05B 47/185*    (2020.01)
*G09G 3/32*    (2016.01)
*G06F 3/14*    (2006.01)

(52) U.S. Cl.
CPC ......... *H05B 47/185* (2020.01); *G06F 3/1446* (2013.01); *G09G 3/32* (2013.01);
(Continued)

(58) Field of Classification Search
CPC ........... G09G 2320/08; G09G 2330/06; G09G 2370/16; G09G 2380/02; G09G 3/32;
(Continued)

(56) References Cited

U.S. PATENT DOCUMENTS 6,089,453 A * 7/2000 Kayser ................... G06Q 30/06
                                                            235/378
6,097,351 A * 8/2000 Nishida ................... G09F 9/307
                                                            345/1.3
(Continued)

FOREIGN PATENT DOCUMENTS

EP            3107355 A1    12/2016
WO    WO-9708942 A1 *  3/1997   ........... A01G 25/167
(Continued)

OTHER PUBLICATIONS

International Search Report and Written Opinion issued in PCT/CA2018/050349, dated Jun. 11, 2018 (11 pages).

(Continued)

*Primary Examiner* — Dmitriy Bolotin
(74) *Attorney, Agent, or Firm* — Chamberlain, Hrdlicka, White, Williams & Aughtry (57) ABSTRACT

A Light-Emitting Diode (LED) apparatus has at least one LED display module. Each LED display module has and integrates therein a plurality of LED display submodules, and at least one wireless communication unit. Each of the plurality of LED display submodules has and integrates thereon one or more LEDs. The LED apparatus also comprises a gateway in wireless communication with the at least one wireless communication unit for instructing the LED display submodules to adjust the lighting of the plurality of LEDs thereon.

20 Claims, 10 Drawing Sheets

(52) U.S. Cl.
CPC ..... *G09G 2320/08* (2013.01); *G09G 2330/06* (2013.01); *G09G 2370/16* (2013.01)

(58) Field of Classification Search
CPC . G09G 2300/026; G06F 3/144; G06F 3/1446; G02F 1/13336
USPC .......................................................... 345/1.3
See application file for complete search history.

(56) References Cited

U.S. PATENT DOCUMENTS

| | | | | |
|---|---|---|---|---|
| 6,314,669 | B1* | 11/2001 | Tucker | G09F 9/33 340/815.45 |
| 7,358,929 | B2* | 4/2008 | Mueller | H05B 47/155 345/1.3 |
| 8,971,809 | B2* | 3/2015 | Lee | G06F 3/041 455/41.2 |
| 2002/0047628 | A1* | 4/2002 | Morgan | H05B 47/155 315/291 |
| 2003/0058191 | A1* | 3/2003 | Yuhara | G09F 9/3026 345/44 |
| 2004/0256625 | A1* | 12/2004 | Russell | H05B 45/10 257/80 |
| 2005/0116667 | A1* | 6/2005 | Mueller | E04F 13/08 315/312 |
| 2006/0109204 | A1* | 5/2006 | Chen | G09G 3/14 345/46 |
| 2007/0069975 | A1* | 3/2007 | Gettemy | G06F 1/1652 345/1.3 |
| 2008/0136348 | A1* | 6/2008 | Varrin | G09G 3/2088 315/291 |
| 2009/9316836 | | 12/2009 | Wang | |
| 2011/0102300 | A1* | 5/2011 | Wood | G06F 3/1446 345/1.3 |
| 2011/0310519 | A1* | 12/2011 | Baba | H04N 5/63 361/91.1 |
| 2012/0091918 | A1 | 4/2012 | Snijder et al. | |
| 2014/0091874 | A1* | 4/2014 | Cook | H01P 1/203 333/12 |
| 2014/0098004 | A1* | 4/2014 | Ngo | A63B 71/0669 345/1.3 |
| 2014/0327600 | A1* | 11/2014 | Ryou | G09G 5/006 345/1.3 |
| 2015/0057013 | A1 | 2/2015 | Goldin | |
| 2015/0169274 | A1* | 6/2015 | Holung | G06F 3/1423 345/1.3 |
| 2016/0019831 | A1 | 1/2016 | Hall | |
| 2016/0132281 | A1* | 5/2016 | Yamazaki | G06F 3/1415 345/1.3 |
| 2016/0162245 | A1* | 6/2016 | Choi | G06F 3/1446 345/1.3 |
| 2016/0210518 | A1* | 7/2016 | Script | G08B 13/19665 |
| 2017/0286044 | A1* | 10/2017 | Kim | G09G 3/32 |
| 2020/0111409 | A1* | 4/2020 | Pahlevaninezhad | G06F 3/1446 |
| 2020/0188958 | A1* | 6/2020 | Freissle | H04W 4/80 |

FOREIGN PATENT DOCUMENTS

| | | | | |
|---|---|---|---|---|
| WO | | 2007112935 A2 | 10/2007 | |
| WO | WO-2007112935 | A2 * | 10/2007 | ............ H05B 45/00 |
| WO | WO-2010132994 | A1 * | 11/2010 | .......... G09G 3/2096 |
| WO | | 2011056242 A1 | 5/2011 | |

OTHER PUBLICATIONS

International Preliminary Report on Patentability issued in PCT/CA2018/050349, dated Feb. 19, 2018 (4 pages).
Extended European Search Report issued in corresponding EP Application No. 18772639.3, dated Nov. 23, 2020. (10 pages).
Written Opinion issued in corresponding Singapore Application No. 11201908774S, dated Mar. 12, 2021. (6 pages).

* cited by examiner

LED APPARATUS HAVING ONE OR MORE COMMUNICATION UNITS AND A METHOD OF EMPLOYING SAME

CROSS-REFERENCE TO RELATED APPLICATIONS

This application claims the benefit of U.S. Provisional Patent Application Ser. No. 62/475,062 filed Mar. 22, 2017, the content of which is incorporated herein by reference in its entirety.

FIELD OF THE DISCLOSURE

The present disclosure relates to Light-Emitting Diode (LED) apparatuses and systems, and in particular to a LED apparatus and system having one or more communication units, and methods employing same.

BACKGROUND

Light-Emitting Diodes (LEDs) are known and have been widely used in industries, mostly as low-power light indicators. In recent years, LEDs with increased power output or increased luminous intensity have been developed and used for illumination. LED lights provide improved energy efficiency, safety, and reliability, and are replacing other types of lights in the market such as incandescent lights, Compact Fluorescent Lamps (CFLs), and the like. As everyday lighting significantly contributes to the burden on power grids and greatly increases the overall requirements for electricity generation, the energy efficiency of LEDs will play a crucial role in future energy savings. It is likely that LEDs will dominate the lighting markets because of their superior energy efficiency.

LEDs with increased power output or increased luminous intensity have also been used for image/video displays, such as digital signage and the like. Digital LED signage is a fast-growing industry due to the increasing demand for marketing, advertising, and the like.

In some LED devices such as LED signage displays, the LEDs thereof need to be controlled individually. In existing LED signage displays, information of the LEDs such as color, light intensity, dimming, and the like, is transferred to the signage through a sender box.

Figure 1:
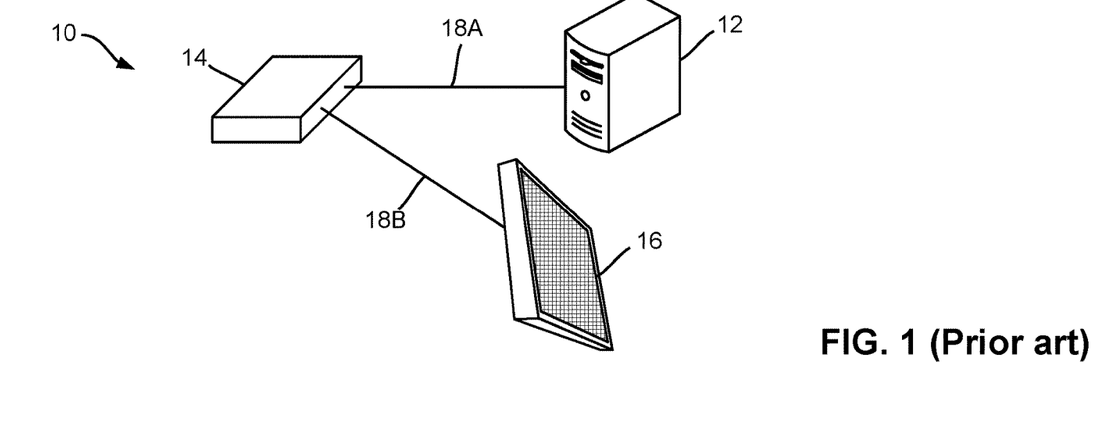
FIG. 1 is a schematic diagram of a prior-art LED signage, illustrating how data is transferred from a computer to the LED signage display.

FIG. 1 shows an example of a prior-art LED signage display 10. As shown, the LED signage display system 10 comprises a LED signage display 16 electrically connected to a sender box 14 via a cable 18B. The sender box 14 is electrically connected to a computer 12 via a cable 18A. Data is first transferred from the computer 12 to the sender box 14 via the cable 18A. Then, the sender box 14 sends the received data via the cable 18B to a LED receiver (not shown) installed in the cabinet of the LED signage display 16. The data received by the LED receiver is used by a central controller (not shown) for controlling the lighting of the LEDs of the LED signage display 16 (for example, on, off, lighting intensity, color, and the like).

Figure 2:
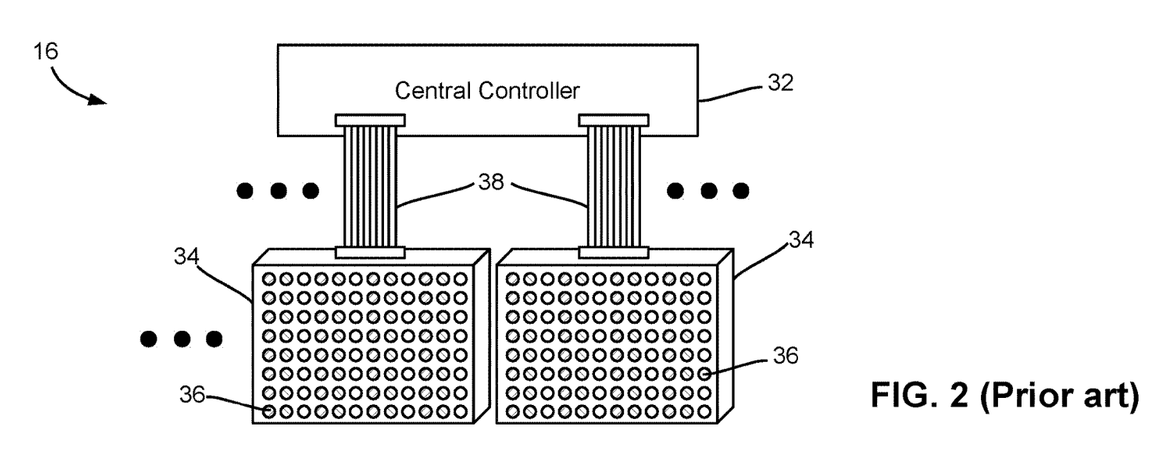
FIG. 2 is a block diagram of a central controller of the prior-art digital LED signage display shown in FIG. 1.

As shown in FIG. 2, a prior-art digital LED signage display 16 may comprise a central controller 32 and one or more LED display modules 34 connected to the central controller 32 via a cable 38 such as a ribbon cable.

Each LED display module 34 comprises a plurality of LEDs 36 and one or more LED drivers (not shown). The LED drivers regulate the power delivered to the LEDs 36 thereby controlling the lighting (for example, off, on, lighting intensity, color, and the like) thereof. Depending on the driving capacity of the LED drivers, each LED driver may be electrically connected to and regulate a subset of the LEDs 36, for example 4, 8 or 16 LEDs 36.

In each LED display module 34, all LED drivers are wired to the central controller 32 through the cable 38. Therefore, a prior-art digital LED signage display 16 and in particular, a digital LED signage display 16 having a large number of LEDs 36 (for example, a digital LED signage with a large display surface), usually comprises a large number of cables/wires. Unfortunately, these cables are often the points of failure for prior-art digital LED signage displays 10.

Moreover, the data communication methods used in prior-art LED signage displays have many disadvantages. For example, a prior-art LED signage display 10 usually comprises a plurality of data communication components such as the sender box, receiver card, central controller, LED drivers, and the like, for transferring data from a computing device to the LED signage display 10 for controlling the LEDs 36 thereof, thereby increasing the cost of the LED signage display.

As a plurality of data communication components are required, the communication system in prior-art LED signage displays 10 may not be reliable due to increased risk of failure of each of the individual data communication components. Moreover, as each LED driver is wired to the central controller, a digital LED signage display 10 having a large number of LEDs usually comprises a significant number of wires for controlling the LEDs 36 thereof, thereby increasing the cost of the digital LED signage display 10, and reducing the reliability thereof because of the high risk that the wires in ribbon cables may get disconnected and/or damaged over time, particularly in outdoor applications.

SUMMARY

Herein, embodiments of a Light-Emitting Diode (LED) apparatus are disclosed. According to one aspect of this disclosure, the LED apparatus comprises: (i) one or more LED display module(s) wherein each of the LED display modules comprise and integrate therein at least one wireless communication unit; (ii) a plurality of LED display submodules wherein each of the plurality of LED display submodules has one or more LEDs; and (iii) a gateway for wireless communication with the one or more wireless communication units for instructing the LED display submodules to modulate the lighting of the plurality of LEDs thereon.

According one aspect of this disclosure, there is provided a LED apparatus. The LED apparatus comprises: at least one LED display module, the at least one LED display module comprising a plurality of LEDs and at least one communication unit; and a gateway functionally coupled to the at least one communication unit, the gateway being configured for wirelessly receiving one or more commands for controlling the LED apparatus and in response to the received one or more commands, sending one or more instructions to the at least one communication unit wirelessly or via a direct current (DC) power line for modulating the lighting of the plurality of LEDs.

In some embodiments, each LED display module further comprises a plurality of LED display submodules wherein each LED display submodule comprises a subset of the plurality of LEDs.

In some embodiments, each LED display module comprises a plurality of communication units; and wherein each of the plurality of LED display submodules comprises one of the plurality of communication units.

In some embodiments, each LED display module comprises only one communication unit.

In some embodiments, each LED submodule further comprises a control unit in signal communication with the at least one communication unit and configured for modulating the lighting of the plurality of LEDs in the LED submodule.

In some embodiments, the at least one LED display module comprises a flexible display surface configurable to a nonplanar display surface.

In some embodiments, the power line has a voltage of about 48V.

In some embodiments, the gateway is configured for communication with the at least one communication unit via the DC power line; and wherein the at least one communication unit comprises a low-pass filter (LPF) for filtering the electrically current of the DC power line for reducing interference and/or noises.

In some embodiments, the at least one communication unit further comprises a data acquisition component for collecting data of the LEDs and for modulating the lighting of the LEDs.

In some embodiments, the at least one communication unit further comprises a communication component functionally coupled to the data acquisition component for transmitting data to and from the data acquisition component.

According to one aspect of this disclosure, there is provided a LED display module. The LED display module comprises: a plurality of LED display submodules wherein each LED display submodule comprises one or more LEDs; a communication hub configured for communication with the plurality of LED display submodules for modulating the lighting of the one or more LEDs thereof; and a gateway configured for communication with the communication hub and for wireless communication with one or more computing devices.

In some embodiments, the LED display module further comprises a flexible housing structure comprising a plurality of pockets for receiving therein the plurality of LED display submodules and a central pocket for receiving the communication hub.

In some embodiments, the communication hub is a wireless communication hub for wireless communication with the gateway.

In some embodiments, the communication hub is a wired communication hub for communication with the gateway via a DC power line.

In some embodiments, the DC power line has a voltage of about 48V.

In some embodiments, the communication hub comprises a low-pass filter (LPF) for filtering the electrically current of the DC power line for reducing interference and/or noises.

In some embodiments, the communication hub further comprises a data acquisition component for collecting data of the LEDs and for modulating the lighting of the LEDs.

In some embodiments, the communication hub further comprises a communication component functionally coupled to the data acquisition component for transmitting data to and from the data acquisition component.

BRIEF DESCRIPTION OF THE DRAWINGS

The embodiments of the present disclosure will now be described with reference to the following figures, in which identical reference numerals in different figures indicate identical elements and in which.

DETAILED DESCRIPTION

Herein, embodiments of a LED device are disclosed. In some embodiments, the LED device may be a LED signage display. In some embodiments, the LED device may be a LED signage display having one or more flexible LED modules, that is, modules that are bendable and may form nonplanar display surfaces.

Figure 3A:
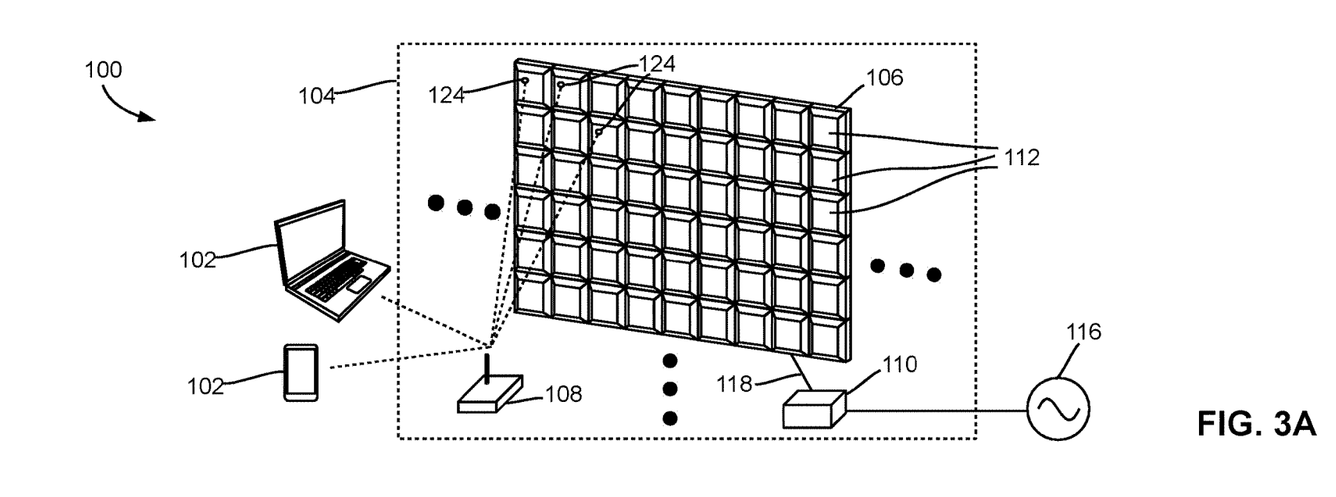
FIGS. 3A and 3B are simplified schematic block diagrams of a LED display system having a LED signage display, according to some embodiments of this disclosure.
Figure 3B:
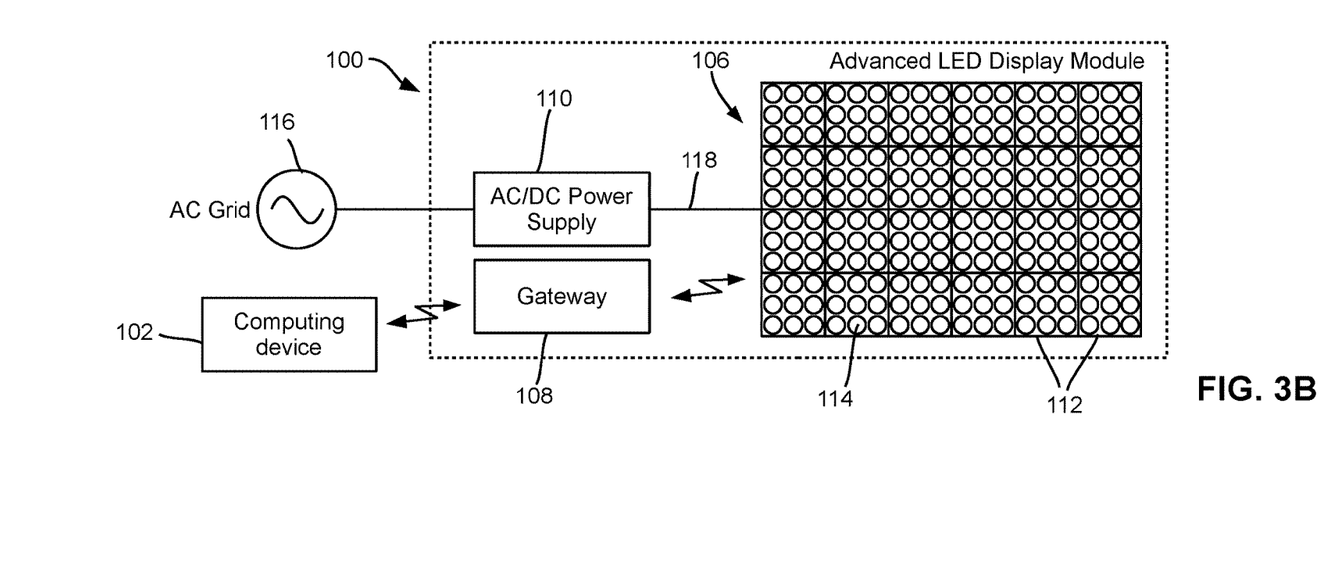

Turning to FIGS. 3A and 3B, a LED display system is shown and is generally identified using reference numeral 100. The LED display system 100 in these embodiments comprises a LED signage display 104 in wireless communication with one or more computing devices 102, such as one or more desktop computers, laptop computers, smartphones, tablets, and the like, using a suitable wireless communication technology such as WI-FI®, (WI-FI is a registered trademark of the City of Atlanta DBA Hartsfield-Jackson Atlanta International Airport Municipal Corp., Atlanta, Ga., USA), BLUETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), wireless mobile telecommunications technologies (such as GSM, CDMA, LTE, and the like), and/or the like.

The LED signage display 104 comprises one or more LED display modules 106 (FIG. 3A showing the rear side thereof and FIG. 3B showing the front side thereof), a gateway 108 and an alternate current (AC) to direct current (DC) power supply 110 (denoted as an AC/DC power supply). The AC/DC power supply 110 converts the electrical power from an external power source 116 into DC power, and outputs the DC power into the LED display modules 106 via a cable 118.

In these embodiments, the one or more LED display modules 106 are in wireless communication with the gateway 108. The gateway 108 is also in wireless communication with the one or more computing devices 102 to transmit data between the computing devices 102 and the LED display modules 106.

Figure 4A:
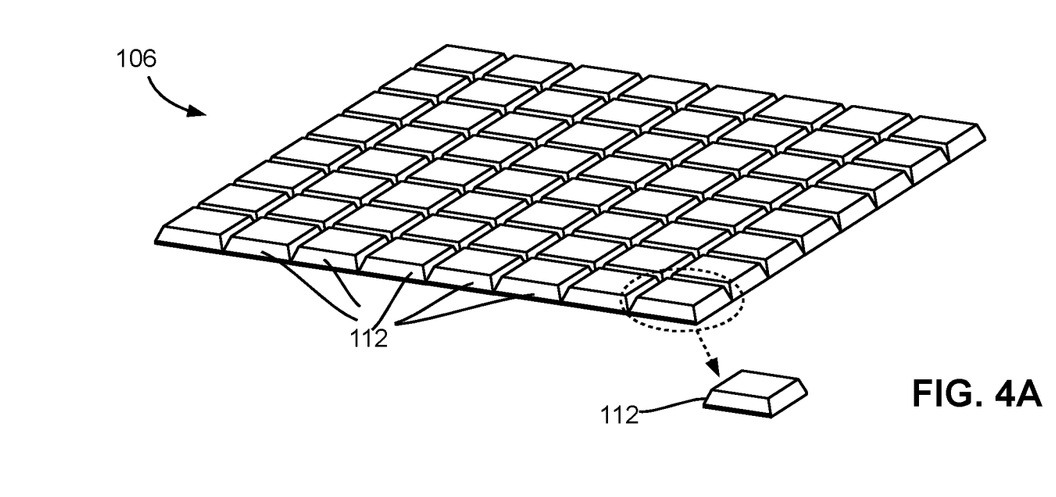
FIG. 4A is a schematic perspective view of a flexible LED display module of the LED signage display of the LED display system shown in FIG. 3A, the flexible LED display module having a plurality of LED display submodules.
Figure 4B:
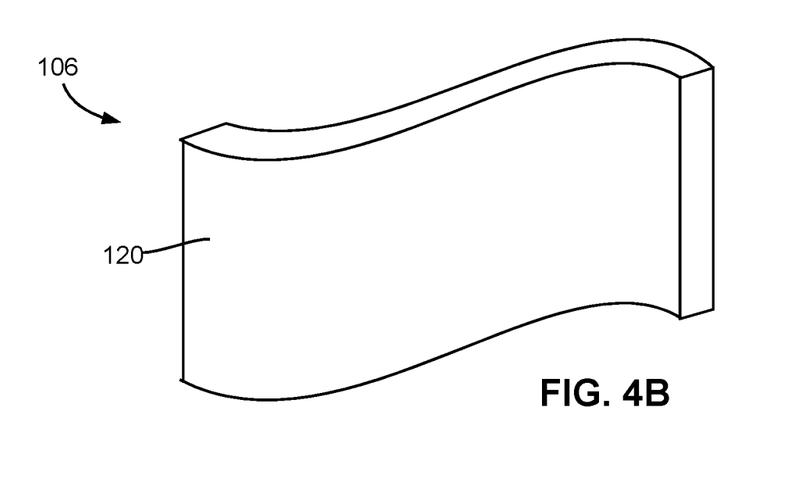
FIG. 4B is a schematic perspective view of the flexible LED display module shown in FIG. 4A, configured with a curved display surface.

Also referring to FIG. 4A (showing the rear side of the LED display module 106), in these embodiments, each LED display module 106 is a flexible LED display module and comprises a plurality of LED display submodules 112 coupled to each other in a flexible manner. Each LED display submodule 112 comprises one or more LEDs 114. Therefore, unlike the prior-art LED signage displays that generally have a planar display surface, the flexible LED display module 106 may be configured to form a nonplanar display surface, for example a curved display surface 120 shown in FIG. 4B. In other embodiments, at least one LED display module 106 may be a conventional non-flexible LED display module.

Figure 5A:
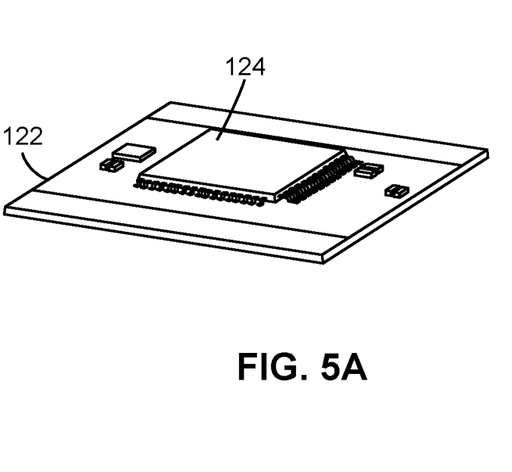
FIG. 5A is a schematic perspective view of a LED power Integrated Circuit (IC) chip in each LED display submodule of the LED display module shown in FIG. 4A, the LED power IC chip having a wireless communication unit integrated thereon.

In these embodiments, each LED display submodule 112 comprises a wireless communication unit integrated therein. FIG. 5A is a schematic perspective view of a LED power Integrated Circuit (IC) chip 122, which comprises a wireless communication unit 124 for wireless communication with the gateway 108.

Figure 5B:
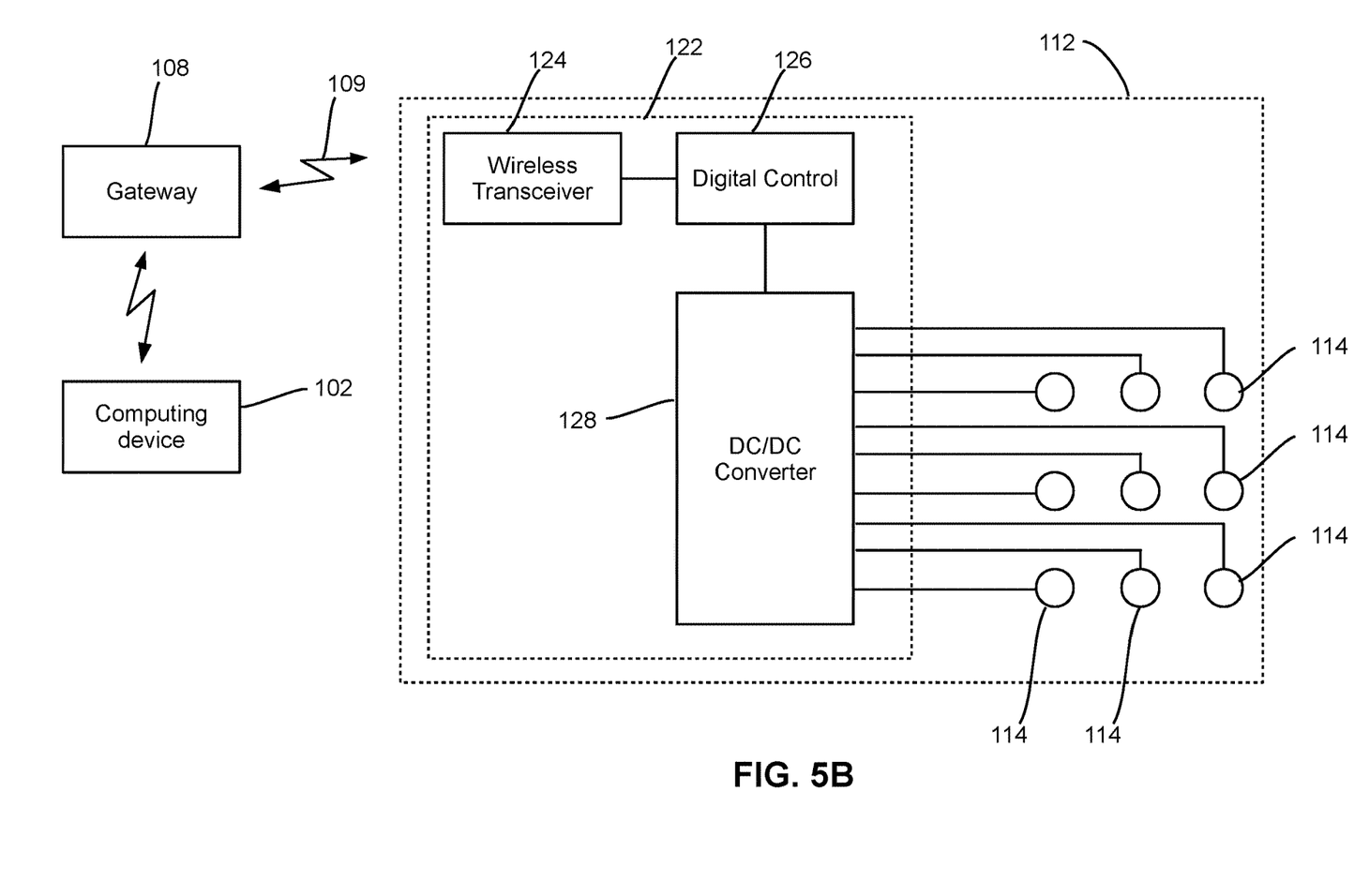
FIG. 5B is a simplified block diagram of a LED submodule of the LED display module shown in FIG. 4A.

FIG. 5B is a simplified block diagram of a LED submodule 112. As shown, the LED submodule 112 comprises and integrates therein one or more LEDs 114, and a LED power Integrated Circuit (IC) chip 122 that provides a multi-functional, integrated solution for individually powering and controlling the LEDs 114 of the LED submodule 112. The LED power IC 122 comprises a wireless communication unit 124 such as a radio frequency (RF) transceiver, a digital control unit 126, or a multi-output DC/DC converter 128.

The wireless communication unit 124 wirelessly receives the control information such as color, lighting intensity, and the like from the gateway 108 (or central controller) of the digital signage 100. In this embodiment, the gateway 108 is physically separated from the advanced LED display module 106 and in response to instructions received from one or more computing devices 102, communicates with the wireless communication unit 124 of the LED Power IC 122 of each LED submodule 112 via a wireless communication connection 109, for controlling the corresponding LEDs 114 in each LED submodule 112. The wireless communication unit 124 also reports the status of each LED 114 in the LED submodule 112 to the computing devices 102 for diagnosis and troubleshooting purposes. The wireless communication unit 124 thus eliminates the need for control wires required in conventional designs.

The digital control unit 126 provides control signals for the multi-output DC/DC converter 128. It also receives the high-level signals from the wireless communication unit 124, then decodes the information therein and finally, produces appropriate gate signals for the digital switches such as metal-oxide semiconductor field-effect transistor (MOSFET) switches of the multi-output DC/DC converter 128. Each digital control unit 126 provides substantial flexibility to control LEDs 114 of the respective LED submodule 112 in an optimized manner, updates the required information through the wireless communication unit 124, and receives system updates.

In reference to the embodiments illustrated in FIGS. 3A and 3B, the computing device 102 may wirelessly communicate with the LED display submodules 112 via the wireless communication units 124, to display an image on the LED signage display surface 120 across the one or more LED display modules 106. In some embodiments, each LED display submodule 112 may also transmit data to the computing device 102 for reporting status thereof, diagnosis and the like.

Therefore, with this design, the LED display system 100 eliminates the need of data cables and the sender box for data communication between the computing devices 102 and the LED display modules 106.

Figure 6:
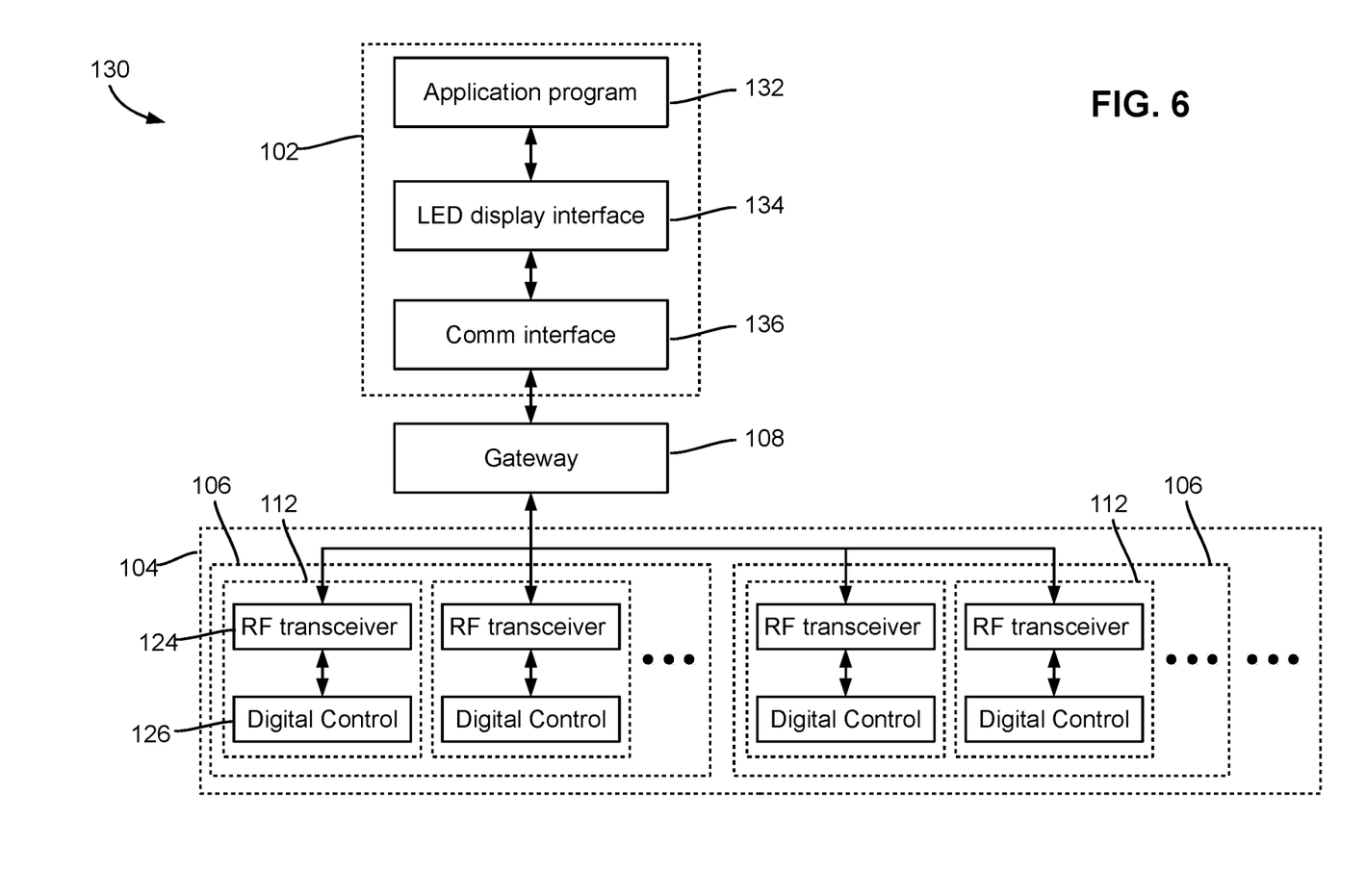
FIG. 6 is a block diagram showing the software structure of the LED display system shown in FIG. 3A.

FIG. 6 is a block diagram showing the software structure 130 of the LED display system 100. As shown, the computing device 102 comprises and executes an application program 132, a LED display interface 134 such as a LED display software driver, and a wireless communication interface 136. The application program 132 is in communication with the LED display interface 134 to perform application-level actions such as instructing the LED signage display 104 to display an image and/or or instructing the LED signage display 104 to report it status.

The LED display interface 134 receives application-level instructions from the application program 132, translates the application-level instructions into machine-level instructions that can be performed by the LED signage display 104, and transmits the machine-level instructions to the gateway 108 via a communication interface 136 of the computing device 102.

For example, the LED signage display 104 may comprise a plurality of LED display modules 106. When the application program 132 is to display an image on the LED signage display 104 across the one or more LED display modules 106, the application program 132 sends to the LED display interface 134 the image to be displayed, together with an application-level image-displaying instruction.

The LED display interface 134 translates the image-displaying instruction into one or more machine-level image-displaying instructions, determines and marks the portion of the image that needs to be displayed on each LED display submodule 112 of each LED display module 106, and wirelessly transmits the marked image and the set of machine-level image-displaying instructions to the gateway 108 via the communication interface 136.

The gateway 108 receives the marked image and the set of machine-level image-displaying instructions from the LED display interface 134, identifies the data (including instructions and image data) to be sent to each LED display submodule 112, and wirelessly sends the identified data to the respective LED display submodule 112.

The RF transceiver 124 of each LED display submodule 112 receives the data, and instructs the digital control unit 126 of the LED display submodule 112 to adjust the lighting of each LED thereof (for example, on, off, light intensity, color, and the like). As a result, the image is then displayed across the one or more LED display modules 106 of the LED signage display 104.

Figure 7:
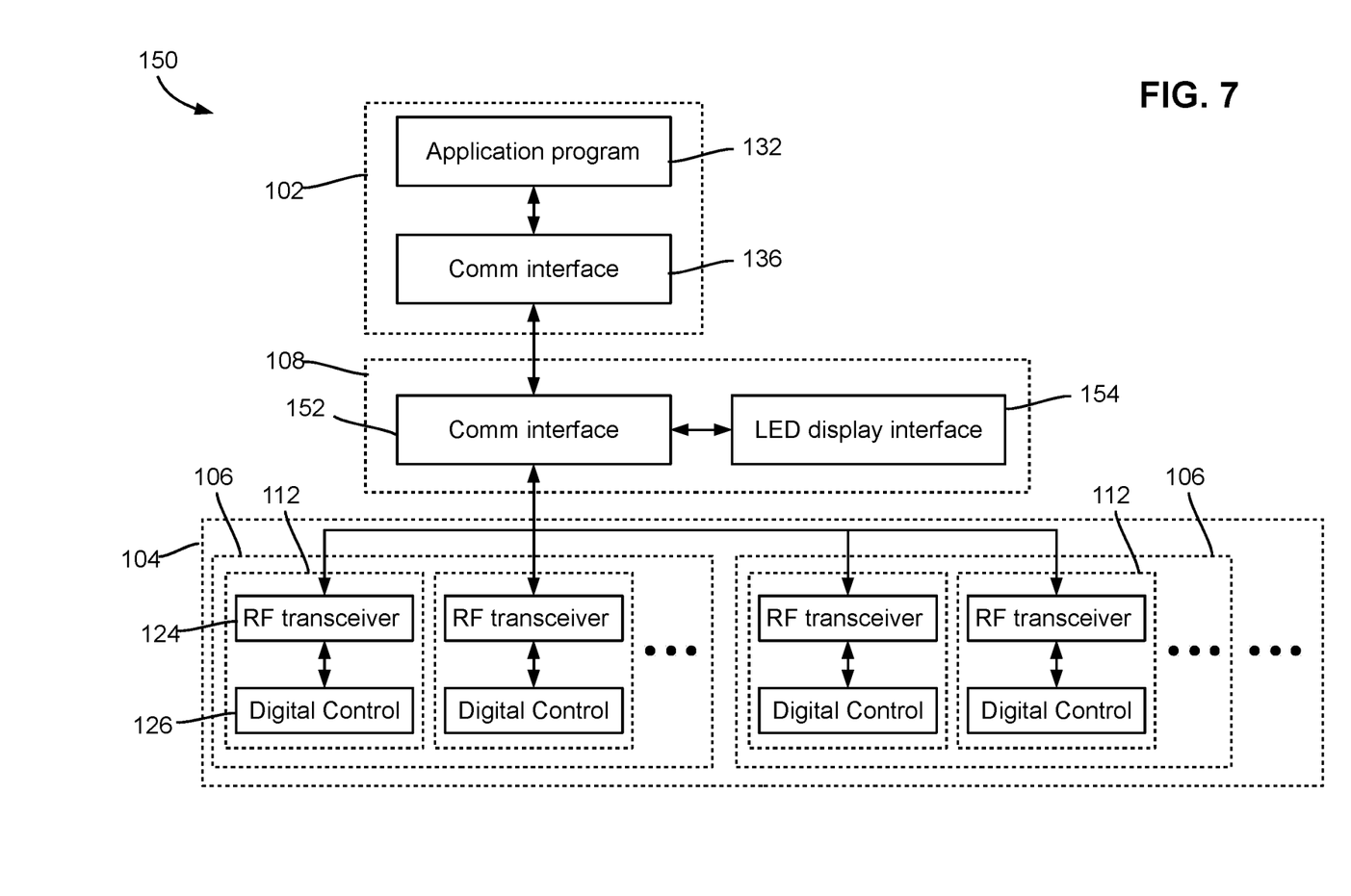
FIG. 7 is a block diagram showing the software structure of the LED display system shown in FIG. 3A, according to some alternative embodiments of this disclosure.

FIG. 7 is a block diagram showing the software structure 150 of the LED display system 100, according to some alternative embodiments. The software structure 150 is similar to the software structure 130 shown in FIG. 6, except that in these embodiments, the computing device 102 does not comprise any LED display interface. Instead, the gateway 108 comprises a LED display interface 154, for example, in the form of a firmware program.

When displaying an image, an application program 132 running in the computing device 102 wirelessly transmits an image-displaying instruction and the image to be displayed to the gateway 108 via a wireless communication interface 136. The gateway 108 wirelessly receives the image-displaying instruction and the image via its wireless communication interface 152, and uses the LED display interface 154 to translates the image-displaying instruction into one or more machine-level image-displaying instructions, identifies the data (including instructions and image data) to be sent to each LED display submodule 112, and wirelessly sends the identified data to the respective LED display submodule 112 via the wireless communication interface 152.

The RF transceiver 124 of each LED display submodule 112 receives the data, and instructs the digital control unit 126 of the LED display submodule 112 to adjust the lighting of each LED thereof (for example, on, off, light intensity, color and the like). As a result, the image is then displayed across the one or more LED display modules 106 of the LED signage display 104.

Figure 8A:
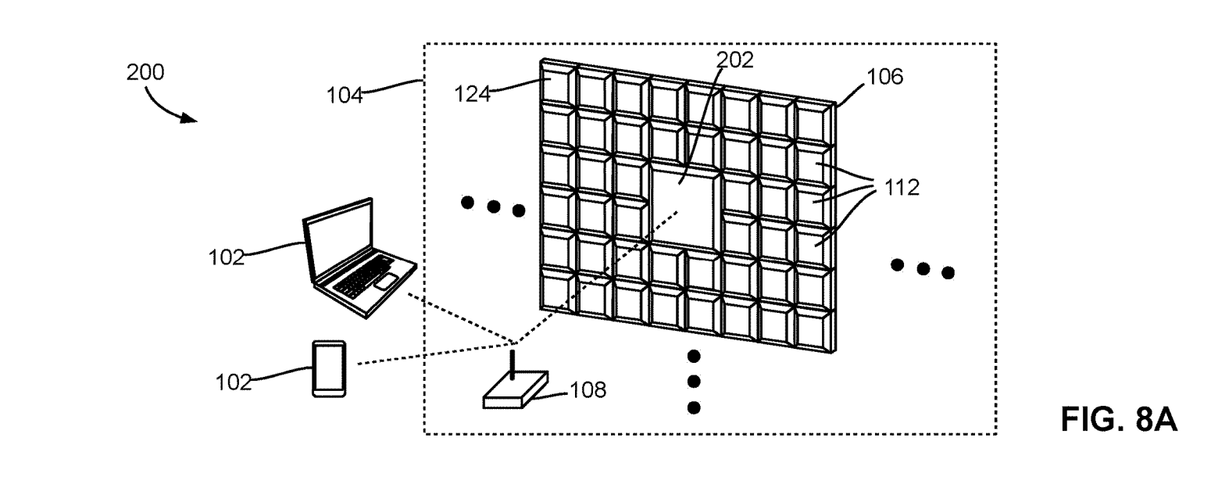
FIG. 8A is a schematic diagram of a LED display system having a LED signage display, according to some alternative embodiments of this disclosure.

FIG. 8A shows a LED display system 200 according to some alternative embodiments. Similar to the LED display system 100 shown in FIG. 3, the LED display system 200 in these embodiments comprises one or more computing devices 102 in wireless communication with a LED signage display 104 using a suitable wireless communication technology. The LED signage display 104 in these embodiments comprises one or more LED display modules 106 in wireless communication with a gateway 108. The gateway 108 is also in wireless communication with the one or more computing devices 102 to transmit data between the computing devices 102 and the LED display modules 106.

Each LED display module 106 may be a flexible LED display module and may comprise a plurality of LED display submodules 112 coupled to each other in a flexible manner. Therefore, the flexible LED display module 106 may be configured to form a nonplanar display surface. In other embodiments, at least one LED display module 106 may be a conventional non-flexible LED display module.

Unlike the LED display system 100 shown in FIG. 3, the submodules 112 of the LED display modules 106 do not comprise any wireless communication unit. Instead, each LED display module 106 further comprises and integrates therein, a wireless communication sub-hub 202 connected to the submodules 112 thereof via suitable circuitry (not shown).

Figure 8B:
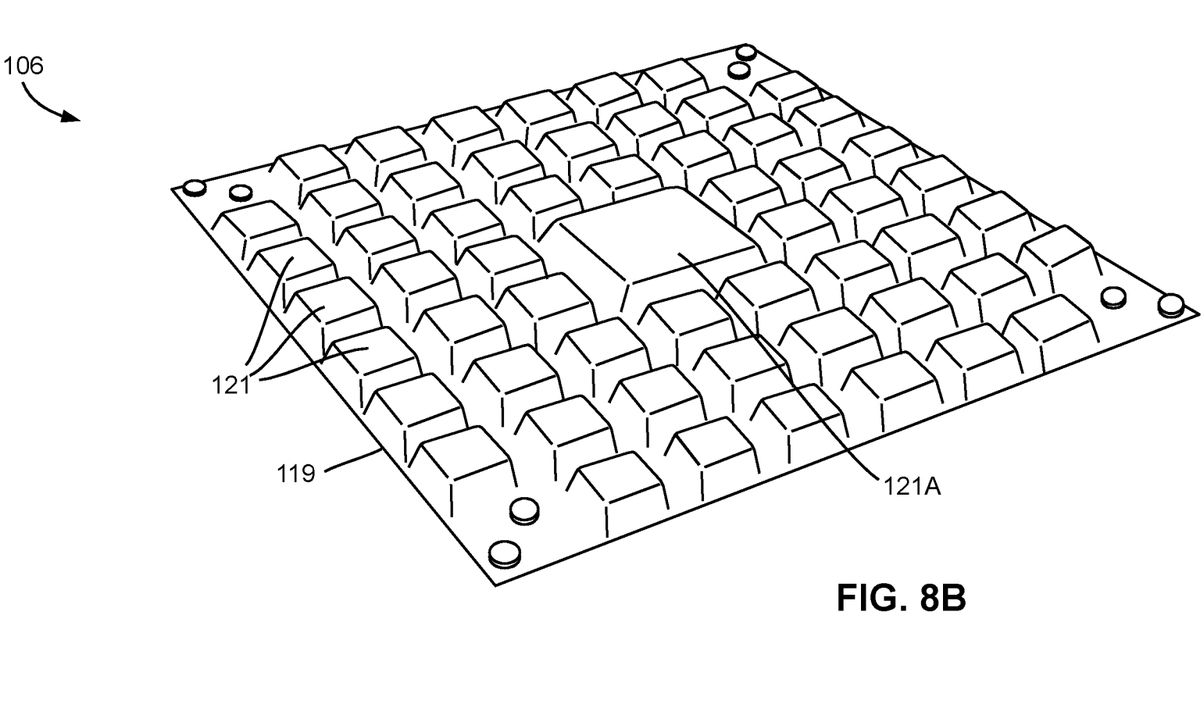
FIG. 8B is a schematic perspective view of a LED module of the LED display system shown in FIG. 8A, the LED module comprising a flexible housing structure.

As shown in FIG. 8B, the LED display module 106 in these embodiments also comprises a flexible housing structure 119 made of a suitable flexible material such as flexible rubber. The flexible housing structure 119 comprises a plurality of cells or pockets 121 for receiving therein a plurality of LED display submodules 112 (not shown in FIG. 8B), and a central pocket 121A for receiving the wireless communication sub-hub 202 (not shown in FIG. 8B). The flexible housing structure 119 also comprises a plurality of electrical conductors or wires embedded therein for interconnecting the LED display submodules 112 and the wireless communication sub-hub 202 received in the pockets 121 and 121A.

Figure 9:
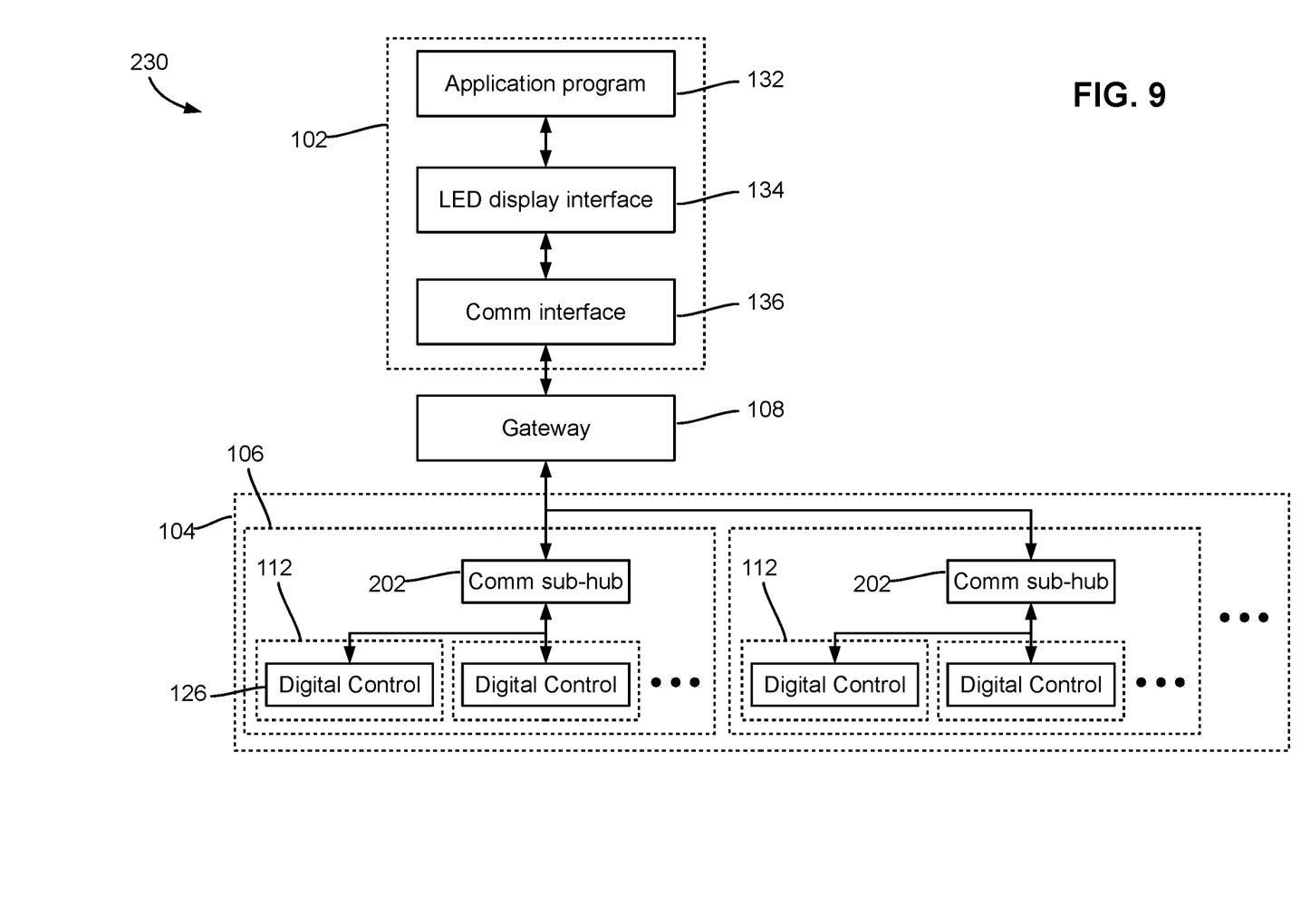
FIG. 9 is a block diagram showing the software structure of the LED display system shown in FIG. 8A.

FIG. 9 is a block diagram showing the software structure 230 of the LED display system 100. As shown, the computing device 102 comprises and executes an application program 132, a LED display interface 134, and a wireless communication interface 136. The application program 132 is in communication with the LED display interface 134 to perform application-level actions such as instructing the LED signage display 104 to display an image, or instructing the LED signage display 104 to report its status.

The LED display interface 134 receives application-level instructions from the application program 132, translates the application-level instructions into machine-level instructions that can be performed by the LED signage display 104, and sends the machine-level instructions to the gateway 108 via a communication interface 136 of the computing device 102.

For example, the LED signage display 104 may comprise a plurality of LED display modules 106. When the application program 132 is to display an image on the LED signage display 104 across the plurality of LED display modules 106, the application program 132 sends to the LED display interface 134 the image to be displayed, together with an application-level image-displaying instruction.

The LED display interface 134 translates the image-displaying instruction into one or more machine-level image-displaying instructions, determines and marks the portion of the image that needs to be displayed on each LED display submodule 112 of each LED display module 106, and wirelessly sends the marked image and the set of machine-level image-displaying instructions to the gateway 108 via the communication interface 136.

The gateway 108 receives the marked image and the set of machine-level image-displaying instructions from the LED display driver 134, identifies the data (including instructions and image data) to be sent to each LED display module 106, and wirelessly sends the identified data to the communication sub-hub 202 of the respective LED display module 106.

In each LED display module 106, the communication sub-hub 202 thereof receives the data from the gateway 108, identifies the data (including instructions and image data) to be sent to each LED display submodule 112, and sends the identified data to the digital control unit 126 of the respective LED display submodule 112. In response, each digital control unit 126 of the LED display submodule 112 adjusts the lighting of each LED thereof (for example, on, off, light intensity, color, and the like). As a result, the image is then displayed across the plurality of LED display modules 106 of the LED signage display 104.

Figure 10:
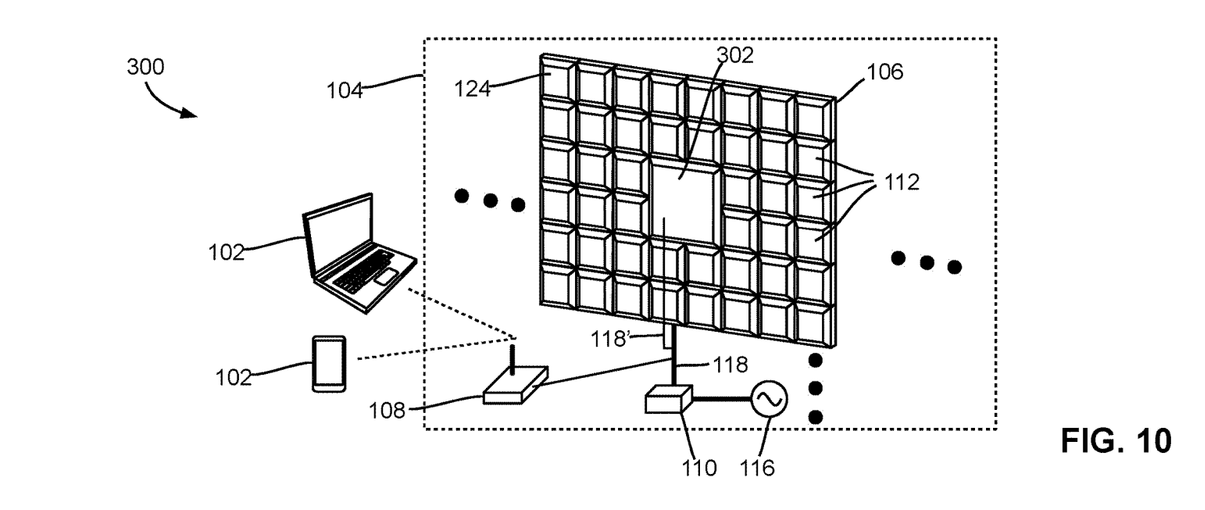
FIG. 10 is a schematic diagram of a LED display system having a LED signage display, according to some alternative embodiments of this disclosure.

FIG. 10 shows a LED display system 300 according to an alternative embodiment. The LED display system 300 is similar to the LED display system 200 shown in FIG. 8A, except that, in this embodiment, each LED display module 106 comprises a wired communication sub-hub 302 which communicates with the gateway 108 via the power line 118. In FIG. 10, the thick line marked with reference numeral 118 represents the power line 118 for powering the LED display module 106, and the thin link marked with reference numeral 118 represents the same power line 118 for data communication.

The advantage of this embodiment is that the LED display module 106, as well as the gateway 108, can use its power cord as a data communication cable, and thus does away with the need for a separate data communication cable or a wireless communication unit.

Figure 11:
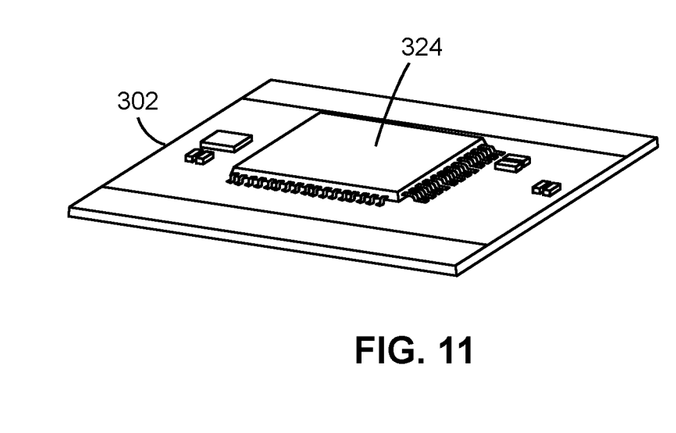
FIG. 11 is a schematic perspective view of the communication sub-hub integrated in each LED display module of the LED display system shown in FIG. 10.

FIG. 11 shows a schematic perspective view of the wired communication sub-hub 302. In this embodiment, the wired communication sub-hub 302 comprises a Power Line Communication (PLC) unit 324 for communication with the gateway 108.

Figure 12:
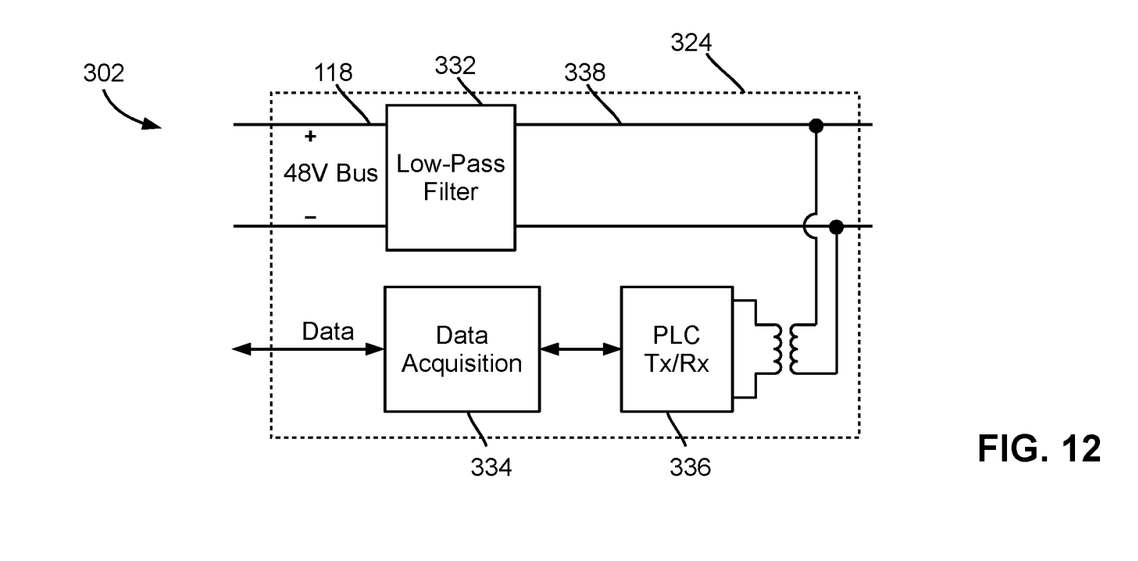
FIG. 12 is a simplified circuit diagram of a PLC unit of the communication sub-hub shown in FIG. 11.

FIG. 12 is a simplified circuit diagram of the PLC unit 324 of the communication sub-hub 302. As shown, the PLC unit 324 comprises a Low-Pass Filter (LPF) block 332, a data acquisition block 334, and a PLC communication block 336. The software structure of the LED display system 300 is similar to that shown in FIG. 9, except that the communication sub-hub communicates with the gateway 108 via the power line.

As shown in FIG. 12, the LPF block 332 is electrically connected to the DC power line 118. As described before, the DC power line 118 is turn electrically connected to the AC power source 116 via an AC/DC convertor 110 (see FIGS. 3 and 10), and may have a DC voltage of about 48V in some embodiments.

The LPF block 332 filters the electrical current to reduce the interference and/or noises. The data acquisition block 334 acquires data from digital control units 126, and/or uses digital control units 126 to adjust the lighting of the LEDs. The PLC communication block 336, which is a data transceiver, is used to receive data from the data acquisition block 334 and send the received data through the power line 338. The PLC communication block 336 may also receive data from the power line 338 and sends received data to the data acquisition block 334.

In the embodiments shown in FIG. 10, data wires are required for establishing data communication between each LED display submodule 112 and the communication sub-hub 302. In some alternative embodiments similar to the LED display system 300 shown in FIG. 10, the LED display submodules 112 and the communication sub-hub 302 are powered by a common high-voltage such as about 48V (DC power source), via suitable power wires. In these embodiments, each LED display submodule 112 also comprises a PLC unit 324 for communicating with the communication sub-hub 302 via the 48V DC power wires.

In some alternative embodiments similar to the LED display system 100 shown in FIG. 3, each LED display submodule 112 comprises a wired communication sub-hub 302 having a PLC unit 324 for directly communicating with the gateway 108 via a power line 304.

In some alternative embodiments, the LED signage display may be a LED lighting apparatus which may be used for lighting purposes. Correspondingly, the LED system in these embodiments is then referred to as a LED lighting system.

Although embodiments have been described above with reference to the accompanying drawings, those of skill in the art will appreciate that variations and modifications may be made without departing from the scope thereof as defined by the appended claims.

What is claimed is:

1. A Light-Emitting Diode (LED) apparatus comprising:
   at least one LED module, each LED module comprising
      a plurality of LEDs and at least one communication unit; and
   a gateway functionally coupled to the at least one communication unit;
   at least one digital control unit coupled to the at least one communication unit; and
   at least one DC-to-DC (DC/DC) converter coupled to the at least one digital control unit and the plurality of LEDs;
   wherein the gateway is configured for wirelessly receiving one or more commands from one or more computing devices for controlling the LED apparatus and in response to the received one or more commands, wirelessly sending one or more instructions to the at least one communication unit;
   wherein the communication unit is configured for receiving the one or more instructions from the gateway, and sending the received one or more instructions to the at least one digital control unit;
   wherein the at least one digital control unit is configured for receiving the one or more instructions, decoding the one or more instructions, and for controlling the at least one DC/DC converter based on the decoded one or more instructions for controlling lighting of the plurality of LEDs.

2. The LED apparatus of claim 1, wherein each LED module further comprises a plurality of communication units and a plurality of LED submodules, each LED submodule comprising a subset of the plurality of the LEDs; and wherein each of the plurality of LED submodules comprises one of the plurality of communication units.

3. The LED apparatus of claim 2, wherein each LED submodule further comprises an Integrated Circuit (IC) chip, wherein the IC chip comprises the at least one digital control unit, the at least one DC/DC converter, and the at least one communication unit.

4. The LED apparatus of claim 1, wherein the at least one LED module comprises a flexible surface configurable to a nonplanar surface.

5. The LED apparatus of claim 1, wherein the at least one DC/DC converter is a multi-output DC/DC converter.

6. The LED apparatus of claim 1, wherein the at least one communication unit further comprises a data acquisition component for collecting data of the LEDs and for adjust the lighting of the LEDs.

7. The LED apparatus of claim 6, wherein the at least one communication unit further comprises a communication component functionally coupled to the data acquisition component for transmitting data to and from the data acquisition component.

8. A LED module comprising:
   a plurality of LED submodules, each LED submodule comprising one or more LEDs;
   a communication hub for communication with the plurality of LED submodules for adjusting lighting of the one or more LEDs thereof; and
   a gateway for communicating with the communication hub wirelessly or via a DC power line, and for wireless communication with one or more computing devices;
   wherein each LED submodule comprises:
   a digital control unit coupled to the communication hub; and
   a DC/DC converter coupled to the digital control unit and the one or more LEDs;
   wherein the gateway is configured for wirelessly receiving one or more commands from the one or more computing devices and in response to the received one or more commands, sending one or more instructions to the communication hub;
   wherein the communication hub is configured for receiving the one or more instructions from the gateway, and selectively sending the received one or more instructions to the digital control unit of each LED submodule;
   wherein the digital control unit of each LED submodule is configured for decoding the one or more instructions and controlling the DC/DC converter based on the decoded one or more instructions for controlling lighting of the one or more LEDs.

9. The LED module of claim 8 further comprising:
a flexible housing structure comprising a plurality of pockets for receiving therein the plurality of LED submodules and a central pocket for receiving the communication hub.

10. The LED module of claim 8, wherein the communication hub further comprises a data acquisition component for collecting data of the LEDs and for adjust the lighting of the LEDs.

11. The LED module of claim 10, wherein the communication hub further comprises a communication component functionally coupled to the data acquisition component for transmitting data to and from the data acquisition component.

12. The LED module of claim 8, wherein the gateway is configured for communication with the communication hub via the DC power line; and wherein the communication hub comprises a low-pass filter (LPF) for filtering the electrical current of the DC power line for reducing interference and/or noises.

13. The LED module of claim 8, wherein the communication hub further comprises a data acquisition component for collecting data of the LEDs and for adjust lighting of the LEDs.

14. The LED module of claim 13, wherein the communication hub further comprises a communication component functionally coupled to the data acquisition component for transmitting data to and from the data acquisition component.

15. The LED module of claim 8, wherein each LED display submodule further comprises:
a DC/DC converter coupled to the one or more LEDs; and
a digital control unit coupled to the DC/DC converter and the communication hub for controlling the one or more LEDs.

16. A circuitry for controlling a plurality of LEDs of a LED module, the circuitry comprising:
a DC/DC converter for coupling to the plurality of LEDs;
a digital control unit; and
a communication unit;
wherein the digital control unit is coupled to the communication unit, and the DC/DC converter is coupled to the digital control unit;
wherein the communication unit is configured for receiving one or more instructions from the one or more computing devices and sending the received one or more instructions to the digital control unit; and
wherein the digital control unit is configured for receiving the one or more instructions, decoding the one or more instructions, and controlling the DC/DC converter based on the decoded one or more instructions for controlling lighting of the plurality of LEDs.

17. The circuitry of claim 16, wherein the communication unit further comprises a data acquisition component for collecting data of the plurality of LEDs and for adjust the lighting of the plurality of LEDs.

18. The circuitry of claim 17, wherein the communication unit further comprises a communication component functionally coupled to the data acquisition component for transmitting data to and from the data acquisition component.

19. The circuitry of claim 16, wherein the communication unit is configured for communication with a gateway via a DC power line; and wherein the communication hub comprises a low-pass filter (LPF) for filtering the electrical current of the DC power line for reducing interference and/or noises.

20. The circuitry of claim 16, wherein the circuitry is an IC chip.

* * * * *